United States Patent [19]
// Maitland et al.

[11] Patent Number: 4,955,033
[45] Date of Patent: Sep. 4, 1990

[54] METAL VAPOR LASER APPARATUS

[75] Inventors: Arthur Maitland, Fife; Ewan S. Livingstone, Tayside, both of Scotland

[73] Assignee: EEV Limited, Chelmsford, United Kingdom

[21] Appl. No.: 347,378

[22] Filed: May 4, 1989

[30] Foreign Application Priority Data

May 24, 1988 [GB] United Kingdom ............... 8812276

[51] Int. Cl.$^5$ ............................................. H01S 3/22
[52] U.S. Cl. ........................................ 372/56; 372/61; 372/62; 372/34
[58] Field of Search .................... 372/34, 56–58, 372/61, 62

[56] References Cited

U.S. PATENT DOCUMENTS

| | | | |
|---|---|---|---|
| 3,891,941 | 6/1975 | Roberts et al. | 372/56 |
| 3,934,211 | 1/1976 | Sucov et al. | 372/56 |
| 3,936,772 | 2/1976 | Lucov et al. | 372/56 |
| 4,126,833 | 11/1978 | Hundstad et al. | 372/58 |
| 4,347,613 | 8/1982 | Pivirotto | 372/56 |

FOREIGN PATENT DOCUMENTS 0144475 6/1985 European Pat. Off. .
0343795 11/1989 European Pat. Off. .

OTHER PUBLICATIONS

8106 IEEE J. of Quantum Electronics, vol. OE-13, No. 9, Sep. 1977, p. 65D.

*Primary Examiner*—William L. Sikes
*Assistant Examiner*—Georgia Y. Epps
*Attorney, Agent, or Firm*—Spencer & Frank

[57] ABSTRACT

Metal vapor laser apparatus includes an envelope within which is contained electrodes and a plurality of cylindrical copper segments arranged between them. During operation of the laser, bromine and helium buffer gas are arranged to flow through the envelope, causing copper bromide to be produced. When a discharge is established between the electrodes, the copper bromide vaporizes and dissociates to give copper vapor which is then excited to produce a population inversion. Such apparatus is able to operate at relatively low temperatures, in the region of 600° C.

25 Claims, 2 Drawing Sheets

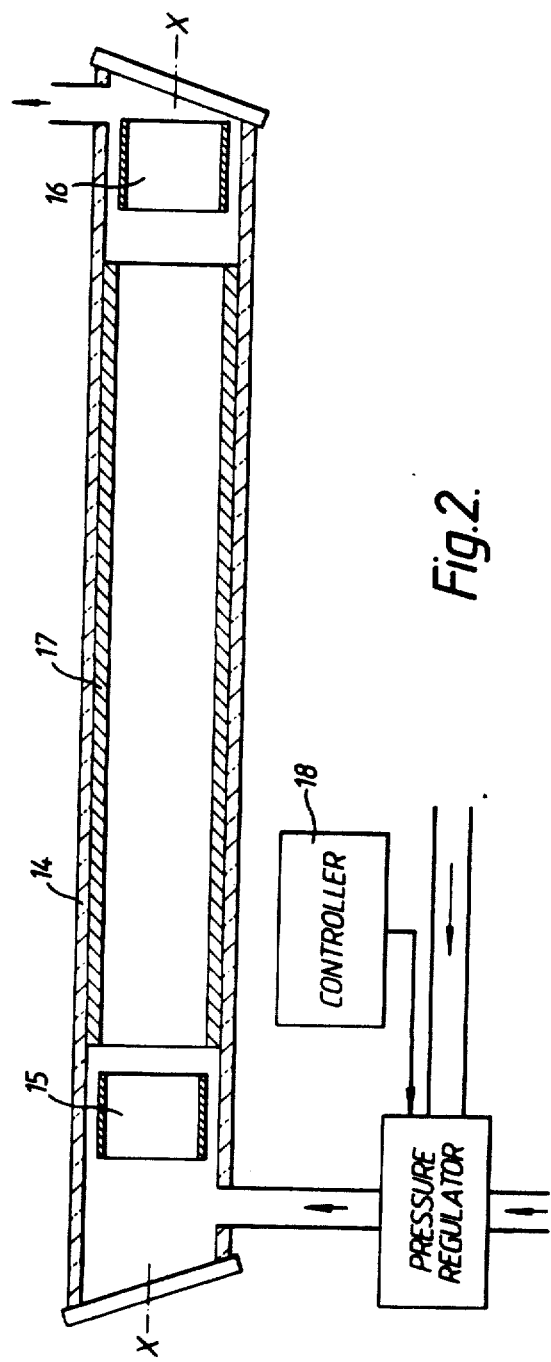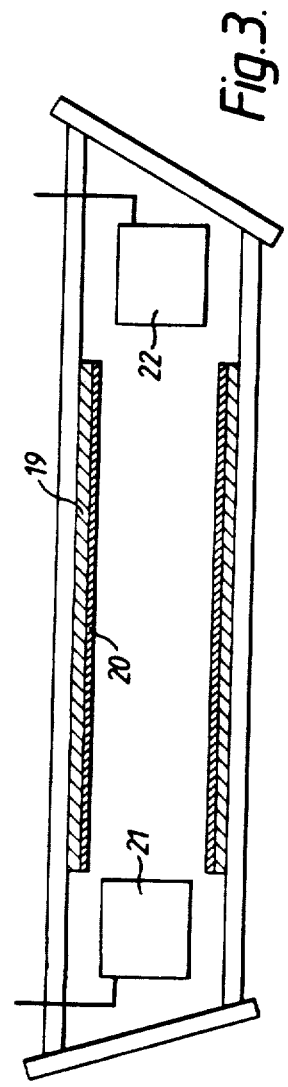

METAL VAPOR LASER APPARATUS

FIELD OF THE INVENTION

This invention relates to laser apparatus and more particularly to such apparatus in which metal vapour constitutes the laser amplifying medium.

BACKGROUND OF THE INVENTION

In a known copper vapour laser, copper metal is distributed along the length of a discharge tube and is heated by a discharge or discharges within the tube to produce copper vapour. The discharge energy also acts to produce a population inversion and achieve laser action. The operating temperatures of such a laser are typically around 1500° C., requiring a considerable amount of thermal insulation around the discharge tube.

SUMMARY OF THE INVENTION

The present invention arose from an attempt to provide an improved metal vapour laser.

According to a first aspect of the invention, there is provided metal vapour laser apparatus comprising an envelope, which contains metal, and means arranged to flow a halogen gas or halogen donor gas through the envelope to produce a metal halide which vaporizes and dissociates on heating to produce metal vapour.

A halogen donor gas is a halogen compound, such as hydrogen bromide, which readily dissociates during operation of the laser apparatus to give halogen molecules or ions. When a halogen donor gas is used, means must be included to cause it to dissociate and thus release free halogen which then reacts with the metal to form a metal halide. Dissociation of the halogen donor gas is preferably achieved by passing an electrical discharge through it. The halogen gas reacts with the metal at its surface to produce a film of metal halide which can be of very high purity if the purity of the copper and halogen, or halogen donor, is also high.

Apparatus in accordance with the invention is able to operate at low temperatures, for example in the region of 600° C. for a copper vapour laser. This avoids the need for extensive thermal insulation around the envelope and also enables a fast start-up time to be achieved.

In an advantageous embodiment of the invention, means are included for varying the pressure within the envelope such that initially it is relatively low to establish stable discharge conditions and subsequently, during heating of the metal halide, it is relatively high to optimize performance in accordance with the changing composition of the gas mixture. The pressures involved depend on the particular dimensions of the laser apparatus and its contents. In a typical arrangement, the pressure is initially less than about 5 torr and then it is increased to about 30 torr.

In a particularly convenient embodiment of the invention, the metal is in the form of a single hollow cylinder arranged coaxially with the longitudinal axis of the envelope. In another embodiment of the invention, a plurality of hollow cylinders is included, the cylinders being spaced apart in the direction of the longitudinal axis. The introduction of copper in the form of a cylindrical segment or segments, in conjunction with the flow of halogen gas, or halogen donor gas over it, enables a particularly uniform distribution of the laser amplifying medium to be produced.

The invention is particularly applicable where the metal is copper, although other metals such as gold may be used, and it is preferred that the halogen, or halogen donated, is bromine.

According to a second aspect of the invention there is provided a metal vapour laser apparatus arranged to operate in a sealed-off mode comprising an envelope containing a metal halide and wherein, prior to laser operation, a halogen gas or halogen donor gas is arranged to flow over metal within the envelope to produce a metal halide.

Preferably, a buffer gas is arranged to flow through the envelope with the halogen or its donor and it is preferred that the buffer gas is one of, or a mixture of, the inert gases such as neon.

BRIEF DESCRIPTION OF THE DRAWINGS

Some ways in which the invention may be performed are now described by way of example with reference to the accompanying drawings, in which:

FIGS. 1, 2 and 3 are schematic longitudinal sections of respective metal vapour lasers in accordance with the invention.

DESCRIPTION OF THE PREFERRED EMBODIMENTS

Figure 1:
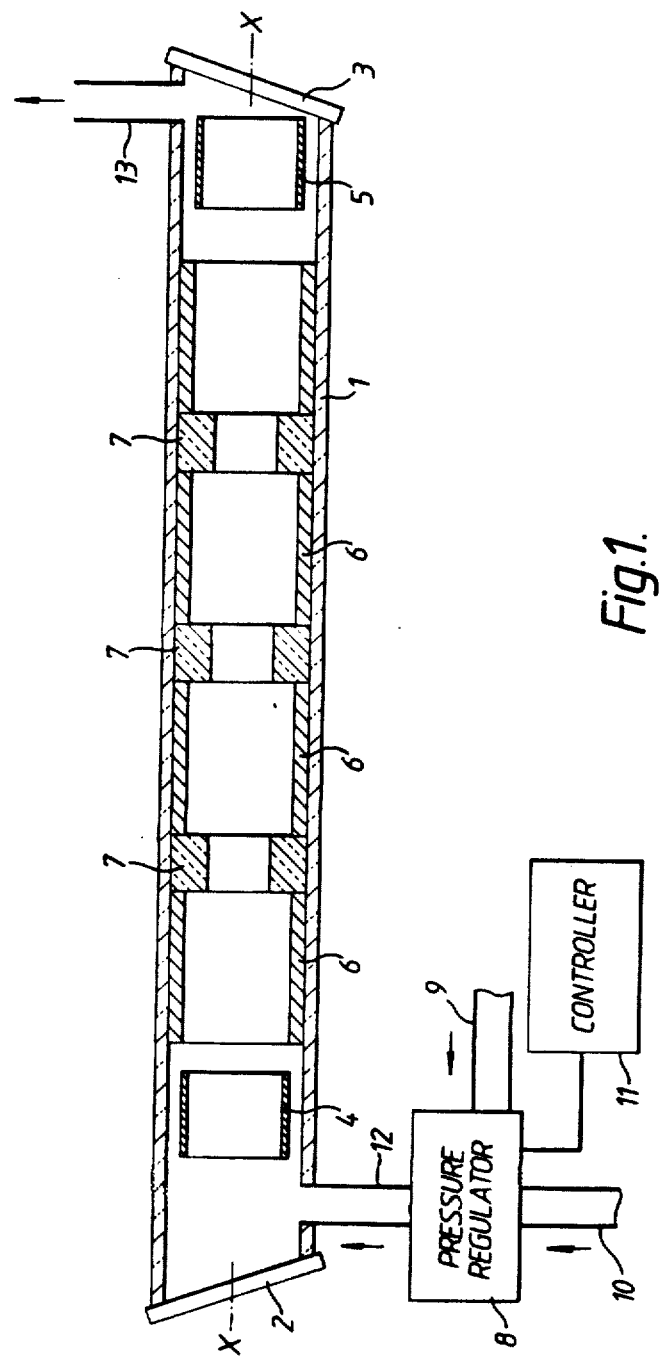

With reference to FIG. 1, copper vapour laser apparatus in accordance with the invention includes a quartz envelope 1 having end windows 2 and 3. Two cylindrical electrodes 4 and 5 are arranged with one at each end of the envelope coaxially with the longitudinal axis X—X. A plurality of cylindrical copper segments 6 are located between the electrodes 4 and 5. The segments 6 are spaced apart by ceramic spacers 7 of smaller internal diameter (id) than the id of the metal segments 6. Each segment 6 has a length which is about twice its diameter and is arranged coaxially with the longitudinal axis X—X. The apparatus includes a pressure regulator 8 to which helium buffer gas and bromine are supplied through lines 9 and 10, respectively. A control circuit 11 governs the proportions and pressure of the gases applied to the envelope 1 via the regulator 8.

During operation of the laser apparatus, a mixture of helium buffer gas and bromine is arranged to flow through the envelope 1, and over the copper segments 6. The gases are applied at an input port 12 and taken from a port 13 at the other end of the envelope 1. The bromine reacts with copper at the surface of the segments 6 to give copper bromide. The control circuit 11 initially acts to maintain the pressure within the envelope 1 at a relatively low level, which in this case is about 5 torr, for a given time to heat the copper segments 6. The control circuit then increases the pressure within the envelope 1 to about 30 torr. Discharges established between the electrodes 4 and 5 cause the copper bromide to vaporize and dissociate to produce copper vapour. The copper vapour is then excited to establish a population inversion and laser action occurs.

When the laser apparatus is operating in its higher pressure mode, the centre of the laser tube is cooler than its ends. Thus, copper bromide tends to condense at the centre rather than on the windows 2 and 3 and forms a "reservoir" of copper bromide which is used during the low pressure stage of the next cycle of operation.

The inner surfaces of the ceramic spacers 7 are nearer the centre of the tube than the copper segments 6 and thus are warmer. The tendency for copper to condense on the spacers 7 is therefore less than would be the case if the spacers 7 had the same internal diameter as the copper segments 6. This difference in internal diameters also reduces movement of any debris or particles along the tube, which is particularly useful in cases where it is wished to operate the laser in a vertical orientation. If such operation is intended, the spacers 7 may be modified by including a depression in one or both of their transverse surfaces so as to retain debris within them.

With reference to FIG. 2, another laser apparatus in accordance with the invention includes a quartz envelope 14 which contains electrodes 15 and 16 and a copper tube 17 located between them, the tube 17 being about 1 meter in length.

During operation, the pressure within the envelope 14 is maintained at a relatively low pressure, which in this case is about 5 torr. The chloride combines with copper at the surface of the tube 17 to give copper chloride. A control circuit 18 maintains the pressure at this lower level for a given time to heat the copper tube 17. It then acts to increase the pressure within the envelope 14 to about 30 torr. Discharges established within the envelope 14 cause the copper chloride to vaporize and dissociate to give copper vapour and excite it to produce a population inversion.

In another copper vapour laser in accordance with the invention, the metal halide is produced within the envelope of the laser by flowing a halogen donor gas, which in this case is hydrogen bromide, over a single long copper cylinder. As the hydrogen bromide is passing over the surface of the metal segment, an electrical discharge is established within the envelope, causing the halogen donor to dissociate and release free halogen. This then combines with the copper at the surface of the copper tube producing an copper bromide.

After the copper bromide has been produced, the laser envelope is "sealed off" to give apparatus as illustrated in FIG. 3. The envelope includes helium buffer gas, the copper tube 19 and the copper bromide 20 on the surface of the tube. Electrodes 21 and 22, which were used to produce the initial electrical discharges during production of the copper bromide, are used to establish further discharges within the tube to heat it. The copper bromide 20 vaporises and dissociates to give the copper vapour which is used as the laser amplifying medium.

We claim:

1. Metal vapour laser apparatus comprising an envelope having a longitudinal axis and containing surfaces of non-gaseous metal, and means arranged to flow a halogen gas through the envelope over the metal surfaces to produce a metal halide thereon, wherein the formed metal halide vaporizes and dissociates or heating to produce a metal vapour.

2. Laser apparatus as claimed in claim 1 further comprising means for varying the pressure within the envelope, wherein the pressure is initially low enough to establish stable discharge conditions and subsequently, during heating of the formed metal halide, the pressure is increased.

3. Laser apparatus as claimed in claim 1, wherein the halogen gas is a halogen donor gas, and the apparatus further comprises means for causing dissociation of the halogen donor gas, said dissociation means releasing free halogen from the donor gas for reaction with the metal surfaces.

4. Laser apparatus as claimed in claim 3 wherein said means for causing the dissociation surfaces are arranged to pass an electrical discharge through the halogen donor gas.

5. Laser apparatus as claimed in claim 2 wherein the metal is in the form of a single hollow cylinder arranged coaxially with the longitudinal axis of the envelope.

6. Laser apparatus as claimed in claim 1 wherein the metal surfaces are is in the form of a plurality of hollow cylinders spaced apart in the direction of the longitudinal axis.

7. Laser apparatus as claimed in claim 6 wherein each cylinder has a length which is up to approximately twice its diameter.

8. Laser apparatus as claimed in claim 1, further including means for producing an electrical discharge within the envelope, said discharge heating the formed metal halide.

9. Laser apparatus as claimed in claim 1 wherein the metal is copper.

10. Laser apparatus as claimed in claim 1 wherein the halogen gas is bromine.

11. Laser apparatus as claimed in claim 1 wherein a buffer gas is arranged to flow through the envelope with the halogen gas.

12. Laser apparatus as claimed in claim 11 wherein the buffer gas is an inert gas.

13. Laser apparatus as claimed in claim 1 wherein the envelope is of quartz.

14. Metal vapour laser apparatus for operation in a sealed-off mode comprising an envelope having a longitudinal axis and surfaces of a non-gaseous metal, two windows, each window being disposed at one end of the envelope, and means for sealing the envelope after the formation of a metal halide on the metal surfaces wherein, prior to a laser operation, a halogen gas is arranged to flow over the non-gaseous metal surfaces within the envelope to produce the metal halide.

15. Laser apparatus as claimed in claim 14, further including means for producing an electrical discharge within the envelope to produce the metal halide.

16. Laser apparatus as claimed in claim 14, wherein the halogen gas is a halogen donor gas, and the apparatus further comprises means for causing dissociation of the halogen donor gas, said dissociation means releasing free halogen from the donor gas for reaction with the metal surfaces to produce the metal halide.

17. Laser apparatus as claimed in claim 16 wherein the said means for causing the dissociation is arranged to pass an electrical discharge through the halogen donor gas.

18. Laser apparatus as claimed in claim 14 wherein the metal surfaces are in the form of a single hollow cylinder arranged coaxially with the longitudinal axis of the envelope.

19. Laser apparatus as claimed in claim 14 wherein the metal surfaces are in the form of a plurality of hollow cylinders spaced apart in the direction of the longitudinal axis.

20. Laser apparatus as claimed in claim 19 wherein each cylinder has a length which is up to approximately twice its diameter.

21. Laser apparatus as claimed in claim 14 and including further including means for producing an electrical discharge within the envelope to heat the metal halide.

22. Laser apparatus as claimed in claim 14 wherein the metal is copper.

23. Laser apparatus as claimed in claim 14 wherein the halogen is bromine.

24. Laser apparatus as claimed in claim 14 wherein a buffer gas is arranged to flow through the envelope with the halogen gas.

25. Metal vapour laser apparatus comprising:
an envelope having a longitudinal axis;
at least one metal tube disposed within the envelope about the longitudinal axis;
means for flowing a halogen gas through the envelope over the metal surface of the tube; and
two electrodes, each electrode being disposed at one end of the envelope, within the flowing halogen gas reacts with the metal surfaces of the tube to form a metal halide thereon, and the two electrodes produce an electrical discharge through the envelope to vaporize and dissociate the reacted metal surfaces to produce a metal vapour.

* * * * *